Dec. 19, 1944.  J. M. NAUL  2,365,430
TELEMETERING INSTRUMENT
Filed Sept. 2, 1942
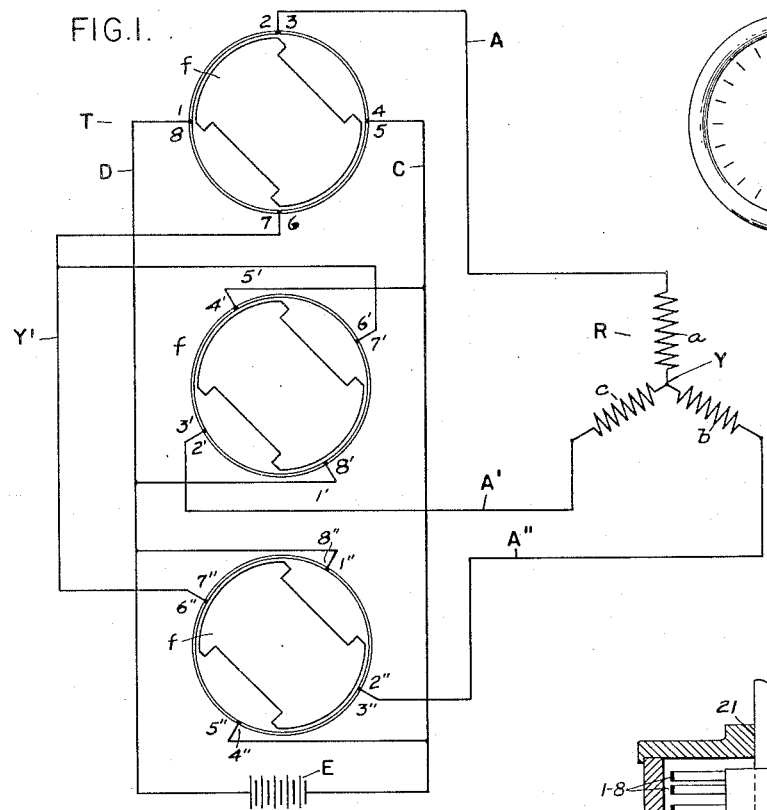
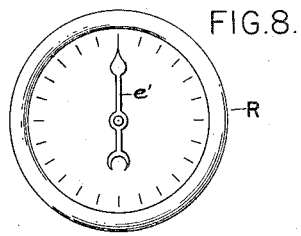
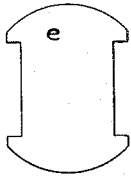
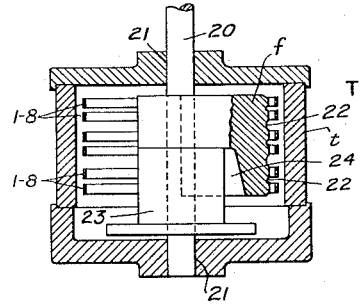
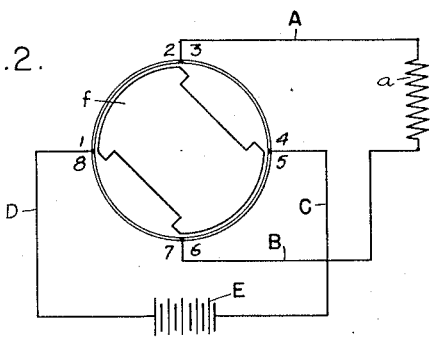
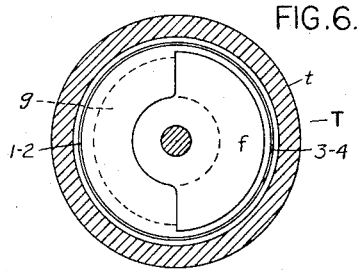
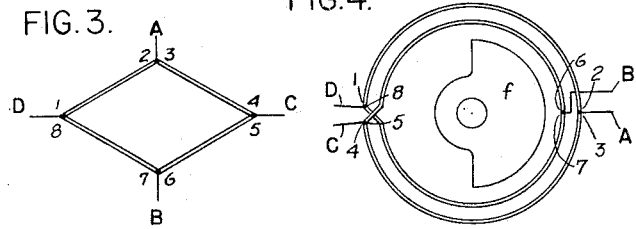
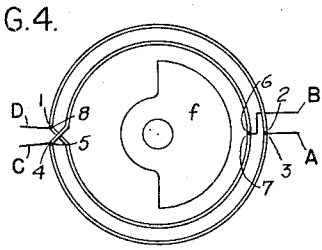
INVENTOR
James M. Naul
Harold F. Scribner
ATTORNEY Patented Dec. 19, 1944

2,365,430

UNITED STATES PATENT OFFICE 2,365,430

TELEMETERING INSTRUMENT

James M. Naul, Fanwood, N. J.

Application September 2, 1942, Serial No. 457,054

11 Claims. (Cl. 177—351)

This invention relates to telemetering instruments and is concerned more particularly with improvements in electrically operated transmitting and receiving instruments designed to transmit information or power from one location to another with a high degree of precision. Devices of this kind have long been used in aircraft for the transmission to the instrument board of the plane, indications of wheel positions, liquid levels, and positions and conditions of various other elements and instrumentalities situated about the plane. Such instruments are also used in other environments for transmitting information from one location to another accurately and instantaneously, and the above reference to aircraft use is but one of the many fields in which such devices are or may be effectively employed.

Telemetering instruments, also called self-synchronizing instruments, comprise essentially a transmitting unit adapted to be situated at the sending station or adjacent the mechanism or material whose condition is to be indicated at another location, and a receiving unit or indicating device adapted to be located on a distant instrument board so that the attendant at that location may, by examining the position of the indicator, receive instant information or instructions from or respecting conditions existing at the transmitting unit or station. With these devices, a source of electrical energy is connected to the transmitter and as the movable element thereof is actuated, the current flow is variably apportioned in three equiangularly spaced coils of the receiver. The electrical energy so received at the receiver sets up a magnetic field across a pivotally mounted magnet that carries the pointer of the indicator. Thus, as the rotor or contact arm of the transmitter is actuated manually or mechanically in response to a movement of the mechanism to which it is connected, a movement of the pointer of the distant receiver is effected simultaneously and in synchronism. A number of wires are connected between the two units, and as the wires may be located and mounted wherever convenient, systems of this character may be utilized to perform important functions in many environments.

The telemetering systems now in use contain, however, several serious objections, foremost of which is the unreliability of the movable contact arm (brushes or sliding contact type) properly to apportion the current flow to the receiver. A slight corrosion of the contacts, invariably will unbalance the system and cause an incorrect position indication at the receiver. With instruments of this character, reliability and accurate functioning is of paramount importance especially when used in conjunction with gunnery and fire control apparatus. Furthermore, with movable brushes or contacts there is always a certain amount of frictional loss or drag that reacts back to the propelling train, and this added work load has the effect, in the case of gyro driven sources, for example, to cause the gyro to precess, which again is undesirable.

The use of brushes, movable contacts, and the like in instruments of this kind has the further disadvantage that the devices are not uniformly smooth or steady in their operation. Each time a brush or contact point passes from one terminal, across a gap to the next, there occurs a noticeable interruption or marked variation in the current and a corresponding unsteadiness in the response of the receiver. The present invention undertakes to render available a transmitter and receiver combination wherein the foregoing disadvantages are not present.

A further aim of this invention is to render available a telemeter system wherein the torque or power required to operate the transmitter is only the power required to overcome its bearing friction whereby to render systems of this kind more sensitive and reliable in their functioning. With modern materials and methods of machining, the frictional losses of the bearings can be made almost a negligible amount.

A further aim of the invention is to provide a telemetering system wherein the power to operate the receiver pointer is all produced by the current source and to avoid all counterflow or power reaction back through the transmitter, which backflow is undesirable for the reason above indicated. By way of additional refinements the invention aims to provide a synchronous machine of sturdy rugged character having greater torque than has been possible of attainment heretofore in a unit of a given size, silent operation, reliability and extreme accuracy in its operation, and one capable of operation over relatively wide extremes of temperature or atmospheric conditions.

In attaining the objectives of this invention it is proposed to eliminate the brush and resistance wire elements of the conventional units entirely and to construct a transmitting unit with conductors whose conductance is made to vary without physically contacting. By constructing a transmitter without brushes or sliding contacts many of the difficulties and undesirable features of existing transmitters, have at once been eliminated.

I have found that certain electrical conductors possess the property of changing their resistance to a flow of current when subjected to the influence of magnetic field, and by constructing a transmitter embodying a magnetically sensitive conductor or conductors, it is possible to effect variations in current flow to the receiver merely by bringing the magnetically sensitive conductor or conductors into a magnetic field to greater or lesser degrees.

All metals do not respond in this manner or at least to the same degree, but I have found that bismuth, which is one of the metals of the diamagnetic group and heads the list antimony, zinc, cadmium, sodium, mercury, lead, silver, copper, gold, arsenic, uranium, rhodium, iridium and tungsten responds to a remarkable degree and is eminently suited for this purpose. This invention proposes a circuit embodying strips or wires of metallic bismuth as the variable resistance elements and to obtain the necessary conductance variations by subjecting the bismuth strips to a magnetic field. Metallic bismuth when under the influence of a magnetic field, has its resistance increased, and by connecting the bismuth strips in series with a power source and the coils of the receiving unit, a movement of the magnetic field into proximity with more or less linear units of the bismuth strips, the division of the current to the receiver coils may be correspondingly apportioned and thereby effecting a corresponding movement of the indicator.

Using magnetically sensitive conductors or resistance elements in the transmitter, gives rise to the need for polarity changing or reversing means, so that the movable element of the receiver may be actuated through a complete circle, if desired. This polarity change is effected by arranging the series of magnetically sensitive conductors in a bridge circuit so that not only will the current flow rise from 0 to maximum but that it will also reverse as the rotor element, which creates the magnetic field, is moved past a distance equivalent to 180 degrees.

The receiving unit comprises a uniformly wound stator element having at least three equally angularly spaced taps, and a magnetic rotor that drives the pointer or other element to be moved. And for each of the stator windings of the receiver there is a bridge circuit of magnetically sensitive conductors in the transmitter unit. To save space and to facilitate manufacturing, it is convenient to arrange the bridge circuits in circular form in coaxial spaced relation within a cup shaped stator element of the transmitter. The rotor element of the transmitter is the complementary magnetic pole piece and is of such axial length as to span all of the bismuth conductors which surround the movable pole and lie between it and the cup which constitutes the outer pole. Preferably the outer pole is continuous so as to avoid undulations in the magnetic flux and consequent unstable response of the receiver.

Other objects and advantages will be in part indicated in the following description and in part rendered apparent therefrom in connection with the annexed drawing.

To enable others skilled in the art so fully to apprehend the underlying features hereof that they may embody the same in the various ways contemplated by this invention, a drawing depicting a preferred typical construction has been annexed as a part of this disclosure and, in such drawing, like characters of reference denote corresponding parts throughout all the views, of which—

Figure 1 of the drawing is a schematic diagram of a communication system embodying the principles of this invention.

Fig. 2 is a schematic diagram of the circuit of a single phase.

Fig. 3 is a line diagram of a bismuth bridge circuit, and Fig. 4, a representation of its mechanical equivalent in circular form.

Figs. 5 and 6 are vertical and horizontal sectional views of a transmitter.

Fig. 7 is a diagrammatic representation of the rotor element of a receiver and, Fig. 8, a face view of a receiver dial.

Referring to Figs. 1 and 2, the letters T and R indicate a transmitter unit and a receiver unit respectively. The construction of the receiver R follows conventional practice and comprises essentially three equispaced stator windings $a$, $b$, $c$, and a freely movable magnetic rotor element $e$ to which a pointer or indicator $e'$ is connected, all, as will be understood, being mounted in a compact housing capable of ready mounting or adaptation to a particular environment.

Three leads from the receiver R run to the transmitter T whose function is to vary the relative polarities and curent strength in the three windings $a$, $b$, $c$, in accordance with the spatial position of the stator relative to the rotor member of the transmitter.

Heretofore, the voltage varying has been effected by moving sliding contacts or brushes along variable resistances, but such devices have long been recognized as being unreliable and inaccurate in performance and definite limitations are imposed on their use.

However, by using a conductor whose resistance may be varied without physically contacting, a through and permanent electrical connection may be made between the power source and the receiver, thus overcoming corrosion and jumpiness in response and, furthermore, rendering it possible to construct a system wherein the torque or power required to operate the transmitter is solely that of overcoming inertia and bearing friction. And equally advantageous is the fact that with a through connection of this character, the torque required by the receiver is all produced by the current source which may be controlled at will, to suit various work load adaptations; and there is no counter torque appearing at the transmitter.

I have found metallic bismuth to be especially suitable for this purpose, for it possesses the property of increasing its resistance to a flow of current upon being placed in a magnetic field. This change is on the order of doubling the resistance with a magnetic field change from 0 to 16,000 gauss.

Therefore, by connecting a bismuth conductor in the circuit of each of the three phase windings of the receiver and proportionately varying their resistances by relatively movable magnet elements, corresponding variations in excitation of the receiver windings will be produced and the reacting rotor thereof will move accordingly.

A single magnetically sensitive conductor in each of the phases of the stator circuits will suffice where there is no necessity for polarity changing, as where either or both rotor elements do not move more than a half turn. Where complete revolutions are required, a series of magnetically sensitive conductors must be used in each circuit and these are preferably arranged in a bridge circuit to obtain polarity reversals. Other circuit arrangements may, of course, be resorted to for effectuating the desired reversal.

Fig. 3 illustrates diagrammatically a bridge circuit wherein lines A and B are the power take-off points, and D and C current input points. Lines 1—2, 3—4, 5—6, and 7—8, are magnetically sensitive conductors, such as bismuth strips. Thus, if the flow of current in the strips 3—4 and 7—8 is impeded, more of the current will flow from D through strip 1—2, out A to the device, and back through B, bismuth strip 6—5 to return line C. The reverse flow occurs when strips 1—2 and 5—6 are subjected to a magnetic field, i. e., the current flows to the device through B and returns through A. While a source of direct current is illustrated in the drawing, it will be understood that a source of alternating current may be employed.

By expanding the diamond shaped bridge circuit (Fig. 3) into a circle (Fig. 2) and inserting therein a rotatable magnet $f$, it will be seen how it becomes possible to reverse polarity of a given stator winding of the receiver as well as to vary the intensity of the current. In the diagram (Figs. 1 and 2) the magnet and rotor $f$ is illustrated as a two-pole element, but in practice the rotor-magnet will preferably assume the shape of a single pole and the outer case of the unit will constitute the complementary pole as illustrated in Figs. 4, 5 and 6.

Also, instead of four magnetically sensitive strips connected in a single circle as represented diagrammatically in Figs. 1 and 2, the four strips forming the bridge circuit, may be arranged in two rings, each using two strips, and tapped and connected as represented in Fig. 4. In this figure, the rings are shown as of two diameters for clarity. They are, however, intended to be of equal diameter and lie one above the other as shown in Fig. 5, each pair of rings of magnetically sensitive material constituting a bridge circuit for one phase winding of the stator of the receiver. And each pair of rings is positioned within the cup shaped transmitter casing T, 120° angularly out of phase with each other so that their power input and output taps correspond in relative location with the 120° spaced windings of the receiver. This 3-phase, 3-positional relationship is diagrammatically represented in the Fig. 1 layout.

In the circuit for one phase winding of the receiver (Fig. 2) the current from the source E, herein represented as a battery, flows through line D, thence through strip 8—7 of the bismuth bridge, strip 8—7 having less resistance than strip 1—2 because it is not in the magnetic field of the magnet $e$. From tap 7, the current flows through line B to the winding $a$ and thence through line A, strip 3—4 to the return line C. Coil $a$ of the receiver is excited and creates a strong flux in one direction. When the magnet $f$ of the transmitter is rotated a quarter turn from the position illustrated in Fig. 2, the conditions are reversed, i. e., current flows from the line D, through strip 1—2, line A to the winding $a$ and back through line B, strip 6—5 to the return line C. Fractional turns of the magnet $f$ of the transmitter effect excitation of the winding $a$ to greater or lesser degrees and with polarity changes according to the position of the magnetic field relative to the bismuth bridge conductors.

The diagram, Fig. 1, represents three of the Fig. 2 circuits connected together in parallel, with one magnetically sensitive bridge circuit connected for each phase winding of the receiver. The bridge conductors at the upper part of the diagram controls the polarity and strength of the current in the receiver winding $a$, the bridge at the lower part of the diagram controls phase winding $b$, and the bridge in the center controls phase winding $c$. The taps A, $A^1$ come off the bridges 120° apart from each other and correspond with the 120° angular positioning of the three phases of the receiver, and the returns (B) are Y connected at the receiver at Y and at the transmitter at $Y^1$. In the transmitter the $Y^1$ taps are 180° away from the A, $A^1$, $A^2$ taps, and the D, C, line taps equidistantly spaced therebetween.

With the position of the magnet $f$ as shown in Fig. 1, the current flowing in phase $a$ of the receiver is equal and opposite to the current flowing in phases $b$ and $c$, in fact, the direction and amplitude of the current flowing in any one phase of the receiver is always equal and opposite to the current in the two other phases. However, as the movable magnet of the transmitter changes the conductance of the several legs of the bridge circuits, corresponding changes in the excitations of windings $a$, $b$, $c$, of the receiver are brought about, thus causing the rotor $e$ and indicator pointer $e^1$ to take up new angular positions in accordance.

The operation of the present system does not rely upon sliding contacts or brushes, etc., to effect variations in current strength to the receiver, and in consequence, there is no extra drag placed upon the operating instrumentality of the transmitter other than that required to overcome bearing friction.

Moreover, the use of permanently connected conductors in the transmitter, and conductors whose resistance to current flow may be varied without physically contacting same, possesses the further important advantages of permanence and unquestionable reliability and steadiness in action under all conditions to which devices of this kind may be subjected.

Figs. 5 and 6 depict one embodiment of this invention in a transmitting unit wherein the outer casing $t$ constitutes a cylindrical pole piece having secured to its inner periphery but insulated therefrom, three sets of bismuth bands, each set being composed of two rings one above the other and connected as to form the legs of a bridge circuit. Within the bismuth bands, the opposite pole piece $f$ of the magnet is rotatably mounted on a shaft 20 in bearings 21. As illustrated in the drawing the revolvable pole piece $f$ is L-shaped in vertical section and approximates a half circle in plan, and formed preferably with circumferential grooves in its periphery to accentuate the magnetic flux at regions directly opposite the bismuth bands. The magnetic lines of force may be developed by a permanent magnet 23 mounted on the shaft 20, or the flux may be induced therein by a winding about a revolvable core. In the latter case the magnetizing coil may be fixed against rotation to the stator casing and project into the space 23. In either case the magnetic lines of force have their greatest density between the outer periphery of the half circle pole piece $f$ and the proximately situated wall of the cylindrical casing $t$, and between the two are situated the bridge circuits of the bismuth strips. While the drawing illustrates a substantial spacial relation between the pole pieces $f$ and $t$, it is preferable to have as little clearance as manufacturing and assembling factors will permit. Bearings 21 are also illustrated schematically in the interest of clarity.

Instead of staggering the several bridge circuits 120° apart as herein explained they may be positioned in alignment and the same results attained by constructing the half circle revolvable pole f in three layers and staggering the layers 120° apart. In this variant form the rotatable pole pieces are dynamically balanced, whereas, in the embodiment illustrated, the rotatable pole is unbalanced and a counterbalancing weight of diamagnetic material, indicated by the dotted lines G in Fig. 6 is provided.

Without further analysis, the foregoing will so fully reveal the gist of this invention that others can, by applying current knowledge, readily adapt it for various utilizations by retaining one or more of the features that, from the standpoint of the prior art, fairly constitute essential characteristics of either the generic or specific aspects of this invention and, therefore, such adaptations should be, and are intended to be, comprehended within the meaning and range of equivalency of the following claims.

Having thus revealed this invention, I claim as new and desire to secure the following combinations and elements, or equivalents thereof, by Letters Patent of the United States:

1. A transmitter unit for a telemetering system combining a stator element and a rotor element spaced therefrom, said elements being mounted for relative movement, means for magnetizing said elements thereby to produce therein magnetic poles of opposite polarity, and a system of relatively stationary current conductors located spatially between the magnetic poles of the said stator and rotor elements whose conductance values vary with the magnetic field intensity and relative positions of the magnetized stator and rotor elements; and means to actuate one of said elements relative to the other to effect variations in the conductance values of said conductors.

2. A transmitter unit for a telemetering system combining a ring shaped stator element and a movable rotor element mounted concentrically therein and having a portion extending in close proximity to the inner surface of said stator, means for magnetizing said elements thereby to produce therein magnetic poles of opposite polarity, and a system of current conductors arranged in a bridge circuit located in the annular space between the magnetic poles of the said stator and rotor elements, said conductors being composed of material possessing the capacity to vary their conductance in accordance with the magnetic field intensity and relative positions of the magnetized stator and rotor elements; and means for moving the rotor element angularly relative to the stator element to vary the conductance value of said conductors and thereby the strength and direction of current flow.

3. A transmitter unit for a telemetering system combining a stator element and a rotor element spaced therefrom, said elements being mounted for relative movement, means for magnetizing said elements thereby to produce therein magnetic poles of opposite polarity, and a system of magnetically responsive current conductors arranged in bridge circuits located spatially between the magnetic poles of the said stator and rotor elements and whose conductance values vary in response to the influence of a magnetic field, each of said bridge circuits being positioned electrically out of phase with each other, and means for moving said rotor element relative to the stator element thereby to remove portions of said magnetically sensitive conductors from the influence of the magnetic field and to bring other portions under the influence of the magnetic field thereby variably to apportion the strength and polarity of the current flow through the said conductors.

4. In a telemetering system the combination of a transmitter unit embodying a plurality of sets of bismuth conductors arranged in bridge circuits and parallel connected in angularly spaced relation 120 degrees apart, magnetic means for subjecting said conductors to the influence of a magnetic field to differentially vary the conductance of the conductors of each of said sets thereby correspondingly to alter the strength and polarity of the current flow therein, said means being capable of operation through 180 degrees.

5. A transmitter for a telemetering system combining a magnetic stator element and a coacting magnetic rotor element mounted in spaced relation thereto, said rotor element having a portion thereof extending toward the stator element so constructed and arranged as to create a concentrated magnetic field in the gap between said portion of the rotor and the stator, a magnetically sensitive current conductor positioned spatially between the stator element and the rotor element, portions of which are adapted to be brought proportionately into and out of the magnetic field between the stator and rotor elements as the rotor element is moved relative to the stator element, current and instrument leads permanently connected to said conductor as to form a bridge circuit, and means for moving the rotor element relative to the stator element thereby to effect an apportionment of the strength and direction of current flow through said conductors in accordance with the position of said rotor element relative to the stator element.

6. A transmitter for a three phase telemetering system combining a magnetic stator element and a coacting magnetic rotor element mounted in spaced relation thereto, said rotor element having a portion thereof extending toward the stator element so constructed and arranged as to create a concentrated magnetic field in the gap between said portion of the rotor and the stator, a plurality of sets of magnetically sensitive current conductors positioned spatially between the stator element and the rotor element, portions of which are adapted to be brought proportionately into and out of the magnetic field between the stator and rotor elements as the rotor element is moved relative to the stator element, current and instrument leads permanently connected to each of said sets of conductors as to form parallel connected bridge circuits having a phase angle of 120 degrees therebetween and means for moving the rotor element relative to the stator element to vary the conductance values of portions of each of the sets of phase related conductors simultaneously, said rotor element being effectively operative through 360 degrees of movement.

7. An electrical conductor comprising a strip of metallic bismuth adapted to be connected in a bridge circuit with a source of current and a receiving device, and a magnet having relatively movable pole pieces physically spaced from said bismuth conductor operative differentially to vary the conductance of selected portions of the said bismuth bridge conductor upon movement of one of said pole pieces relative to the other to vary the conductance value and direction of current flow therethrough in accordance with the positional relation of said pole pieces.

8. A transmitter for use in conjunction with a three phase receiver combining a magnetic stator element and a magnetic rotor element, said elements constituting pole pieces of opposite polarity, a plurality of sets of magnetically sensitive conductors positioned spatially between the said plate pieces, each of said sets of conductors having pairs of current leads and pairs of receiver leads connected in the form of a bridge circuit adapted to be connected respectively to a current source and to a given phase winding of the receiver, and means mounting each of said sets of sensitive conductors in spatial phase relation to each other corresponding to the phase relation of the respective receiver windings so that a unidirectional movement of the rotor element relative to the stator element and said sensitive conductors differentially affects the conductance of all of said sets of conductors and a unidirectional following movement at the receiver.

9. A transmitter for polyphase receivers combining a magnetic stator element of annular form and a magnetic rotor element of segmental form, said elements constituting pole pieces of opposite polarity, a plurality of sets of magnetically sensitive current conductors positioned spatially between the said pole pieces, each of said sets of conductors having pairs of current leads and pairs of receiver leads connected therewith in the form of a bridge circuit and adapted to be connected respectively to a current source and to the respective phase windings of a polyphase receiver, and means mounting each of said sets of sensitive conductors in angular phase relation relative to said segmental rotor element in correspondence with the phase relation of its respective phase winding of the receiver so that a unidirectional movement of the rotor element relative to the stator element and to said sensitive conductors through 180 degrees differentially affects the conductance of all of said sets of conductors and effects a unidirectional following movement of the receiver.

10. A telemeter unit combining an annularly continuous stator element and a segmental rotor element mounted concentrically therewith and adapted for movement angularly relative thereto through a complete circle, said elements being magnetically charged and constituting opposite pole pieces of a magnet, a magnetically sensitive current conductor positioned spatially between said pole pieces and of a length not less than the distance traversed by an angular movement of 360 degrees of the segmental rotor relative to the continuous stator element, pairs of current leads and instrument taps fixedly connected with said sensitive conductor in the form of a bridge circuit, and means for moving said pole pieces of the magnet angularly relatively to each other thereby to effect a variation in the conductance of different portions of the said sensitive conductors in accordance with the angular position of said segmental pole piece relative to the annular pole piece.

11. In a telemetering system the combination of a transmitter unit embodying variable conductance elements with leads connected therewith in the form of a bridge circuit and adapted to be connected respectively with a source of current and a receiving device, and magnetic means comprising a pair of relatively movable magnet pole pieces positioned close to but in spaced relation with said variable conductance elements such that the conductance of the latter is influenced by the magnetic field of the said pole pieces, and means for moving said pole pieces relatively to one another and to said variable conductance elements to effect a change in the strength and polarity of current flow in said bridge circuit corresponding to and in accordance with the change in the positional relation of said pole pieces, said pole pieces being capable of effective relative movement through 180 electrical degrees.

JAMES M. NAUL.